United States Patent
Rosado et al.

(10) Patent No.: US 9,270,189 B2
(45) Date of Patent: Feb. 23, 2016

(54) POWER CONVERTER AND METHOD

(75) Inventors: Sebastian Pedro Rosado, Bayern (DE); Henry Todd Young, Erie, PA (US); Simon Herbert Schramm, Bayern (DE); Alvaro Jorge Mari Curbelo, Bavaria (DE); Jason Daniel Kuttenkuler, Erie, PA (US); Zhihui Yuan, Bayern (DE)

(73) Assignee: General Electric Company, Schenectady, NY (US)

( * ) Notice: Subject to any disclaimer, the term of this patent is extended or adjusted under 35 U.S.C. 154(b) by 670 days.

(21) Appl. No.: 13/475,550

(22) Filed: May 18, 2012

(65) Prior Publication Data

US 2013/0308344 A1 Nov. 21, 2013

(51) Int. Cl.
*H02M 3/335* (2006.01)
*H02J 1/00* (2006.01)
*H02M 1/00* (2007.01)

(52) U.S. Cl.
CPC .. *H02M 3/33584* (2013.01); *H02M 2001/0058* (2013.01); *Y02B 70/1491* (2013.01)

(58) Field of Classification Search
CPC ............. H02M 3/33584; H02M 3/33576; H02M 3/33592; H02M 3/337; H02M 7/4807; H02M 2001/0058; H02M 3/33569; H02M 3/3376; H02M 7/797; H02M 7/5387; H02M 2003/1586; H02M 3/3378
USPC .......................................... 363/15–17, 21.04
See application file for complete search history.

(56) References Cited

U.S. PATENT DOCUMENTS

| | | | | |
|---|---|---|---|---|
| 3,517,300 | A | * | 6/1970 | McMurray ...................... 363/25 |
| 5,027,264 | A | | 6/1991 | DeDoncker et al. |
| 5,208,740 | A | | 5/1993 | Ehsani |
| 8,780,588 | B2 | | 7/2014 | Teraura et al. |
| 2002/0172061 | A1 | | 11/2002 | Phadke |
| 2009/0034299 | A1 | * | 2/2009 | Lev ................................ 363/17 |

FOREIGN PATENT DOCUMENTS

| | | |
|---|---|---|
| CN | 1874126 A | 12/2006 |
| CN | 1874128 A | 12/2006 |

(Continued)

OTHER PUBLICATIONS

Hua Bai and Chris MI; Eliminate Reactive Power and Increase System Efficiency of Isolated Bidirectional Dual-Active-Bridge DC-DC Converters Using Novel Dual-Phase Shift Control; IEEE Transactions on Power Electronics, vol. 23, No. 6, Nov. 2008.

(Continued)

*Primary Examiner* — Adolf Berhane
*Assistant Examiner* — Henry Lee, III
(74) *Attorney, Agent, or Firm* — GE Global Patent Operation; John A. Kramer

(57) ABSTRACT

A power converter apparatus includes a primary bridge having a plurality of diagonally opposed primary power elements, and a secondary bridge having a plurality of diagonally opposed secondary power elements. The primary and secondary bridges are electrically coupled by a transformer. At least one control unit is configured to phase-shift switch the primary and secondary power elements, such that one or more of the primary and secondary power elements are switched off under near-zero current conditions to reduce voltage and current stresses and commutation losses within the power converter.

17 Claims, 10 Drawing Sheets

(56) References Cited

FOREIGN PATENT DOCUMENTS

| EP | 1732200 | A1 | 12/2006 |
|----|---------|----|---------|
| EP | 1998432 | A2 | 12/2008 |
| JP | 2011234541 | A | 11/2011 |
| JP | 2012044801 | A | 3/2012 |
| TW | 201039541 | A | 11/2010 |

OTHER PUBLICATIONS

F. Krismer, S. Round, J.W. Kolar; Performance Optimization of a High Current Dual Active Bridge with a Wide Operating Voltage Range; ETH Zurich, Power Electronic Systems Laboratory; Zurich, Switzerland.

Oliver D. Patterson and Deepakraj M. Divan; Pseudo-Resonant Full Bridge DC/DC Converter; IEEE Transactions on Power Electronics, vol. 6, No. 4, Oct. 1991.

Amit Kumar Jain and Rajapandian Ayyanar, PWM Control Dual Active Bridge: Comprehensive Analysis and Experimental Verification; IEEE Transactions on Power Electronics, vol. 26, No. 4, Apr. 2011.

Nikolaus Schibli; Symmetrical Multilevel Converters With Two Quadrant DC-DC Feeding; Ecole Polytechnique Federale De Lausanne; THÈSE No. 2220 (2000).

German G. Oggier, Guillermo O. Garcia and Alejandro R. Oliva; EEE Transactions on Power Electronics, vol. 24, No. 7, Jul. 2009.

Search Report and Written Opinion from corresponding PCT Application No. PCT/US2013/039277 dated Jun. 28, 2013.

Unofficial English Translation of Japanese Office Action issued in connection with corresponding JP Application No. 2015-512675 on Oct. 20, 2015.

\* cited by examiner $$t_{sh1} = \frac{d_{sh} \cdot N \cdot V_{dc2} - (N \cdot V_{dc2} - V_{dc1}) \cdot \frac{T_s}{2}}{(N \cdot V_{dc2} + V_{dc1})}$$

$$t_{sh2} = \frac{d_{sh} \cdot V_{dc1} + (N \cdot V_{dc2} - V_{dc1}) \cdot \frac{T_s}{2}}{(N \cdot V_{dc2} + V_{dc1})}$$

FIG. 5

$$t_{sh1} = \frac{d_{sh} \cdot N \cdot V_{dc2} - (N \cdot V_{dc2} - V_{dc1}) \cdot \frac{T_s}{2} + V_{dc2} \cdot N \cdot t_0}{(N \cdot V_{dc2} + V_{dc1})}$$

$$t_{sh2} = \frac{d_{sh} \cdot V_{dc1} + (N \cdot V_{dc2} - V_{dc1}) \cdot \frac{T_s}{2} + V_{dc1} \cdot t_0}{(N \cdot V_{dc2} + V_{dc1})}$$

FIG. 6

POWER CONVERTER AND METHOD

BACKGROUND

1. Technical Field

Embodiments of the invention relate generally to power converters. Other embodiments relate to power converters with reduced commutation losses and electrical stresses.

2. Discussion of Art

Trains typically feature a number of cars that are pushed or pulled by a locomotive. The locomotive has traction wheels engaged with the track. In modern designs, electric wheel motors drive the traction wheels. The electric wheel motors are powered via electrical distribution from one or more engine-driven generators housed within the locomotive. The traction wheels and wheel motors can be reversibly configured, to also act as brakes for slowing the locomotive.

Similarly, in the mining industry, large off-highway vehicles ("OHVs") usually employ electrically motorized wheels for propelling or retarding the vehicle. In particular, OHVs typically include a large horsepower diesel engine (or other engine) in conjunction with an alternator, a main traction inverter, and a pair of wheel drive assemblies housed within the rear tires of the vehicle. The diesel engine is directly associated with the alternator such that the diesel engine drives the alternator. The alternator powers the main traction inverter, in which semiconductor power switches commutate the alternator output current to provide electrical power to electric drive motors of the two wheel drive assemblies.

In both locomotive and OHV applications, solid state power converters are used to provide high voltage current from the generators or alternators to the wheel motors. Such power converters include inductive coils to step down the voltage as well as semiconductor power switches to commutate the current. Although the above-described applications are typical, it will be appreciated that power converters can be used in many other settings.

By way of example, an isolated bidirectional H-bridge converter may be utilized. This type of converter includes two full semiconductor bridges connected through a galvanic isolated power transformer. Such a converter can transfer power in both directions with voltages at the primary and secondary side varying within a range.

Isolated H-bridge converters may include power elements such as insulated gate bipolar transistors (IGBTs) that are switched on and off by drive circuitry in an alternating fashion to produce an output AC or other waveform. Other types of switchable semiconductor devices may also be used in the H-bridge circuit of such converters. These include power BJT transistors, power MOSFETs, integrated gate commutated thyristors (IGCT), gate turn-off thyristors (GTO), or any other device controllable semiconductor switched by a low power signal (e.g., gate signal). Switching under load, however, can lead to commutation losses and electrical stresses.

Therefore, it is desirable to reduce power converter commutation losses and electrical stresses to improve converter operation and efficiency.

BRIEF DESCRIPTION

An embodiment of the present invention relates to a power converter apparatus that includes a primary bridge having a plurality of diagonally opposed primary power elements, and a secondary bridge having a plurality of diagonally opposed secondary power elements. The primary and secondary bridges are electrically coupled by a transformer. At least one control unit is configured to phase-shift switch the primary and secondary power elements, such that one or more of the primary and secondary power elements are switched off under zero current conditions.

According to another embodiment of the present invention, a power converter includes a primary bridge having a plurality of diagonally opposed primary power elements; a secondary bridge having a plurality of diagonally opposed secondary power elements; and a transformer electrically coupled to the primary and secondary bridges. At least one control unit is configured to phase-shift switch the primary and secondary power elements, such that there is a bridge phase-shift between the primary and secondary bridges, and there is a diagonal phase-shift within each of the primary bridge and the secondary bridge.

Another aspect of the present invention relates to a method for controlling a power converter. The method includes at least one of diagonal phase-shifted switching of at least two diagonally opposed primary power elements within a primary bridge or diagonal phase-shifted switching of at least two diagonally opposed secondary power elements within a secondary bridge of the power converter, and also includes bridge phase-shifted switching of at least one element in the secondary bridge, relative to a homologous element in the primary bridge.

In another aspect, a power converter is controlled by phase-shifted switching of primary power elements within a primary bridge of the power converter, and phase-shifted switching of secondary power elements within a secondary bridge of the power converter, such that one or more of the primary and secondary power elements are switched off under zero current conditions and are switched on under zero voltage conditions.

DRAWINGS

The present invention will be better understood from reading the following description of non-limiting embodiments, with reference to the attached drawings, wherein below:

FIGS. 3(a)-3(j) are schematic views of power element states within a power converter in accordance with an embodiment of the present invention.

Figure 3A:
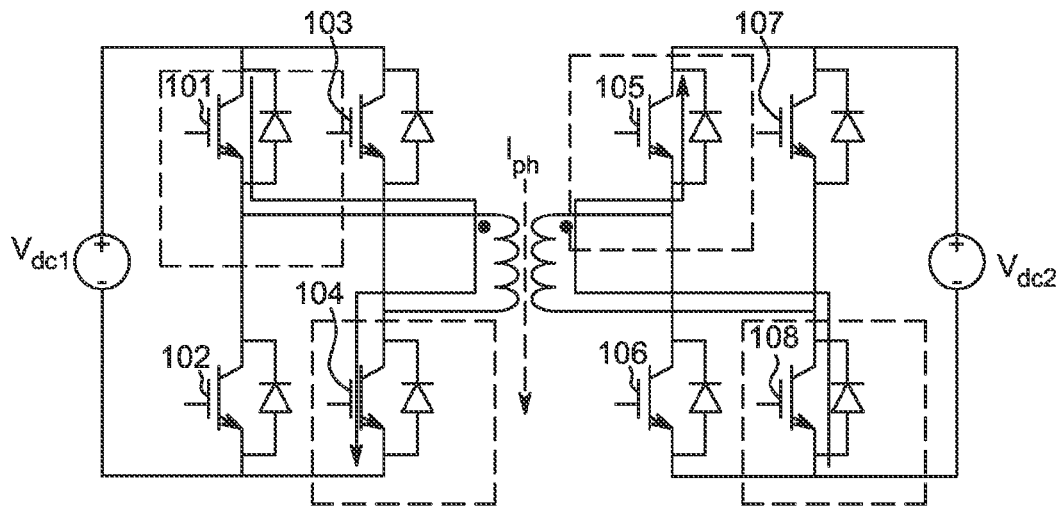
Figure 3B:
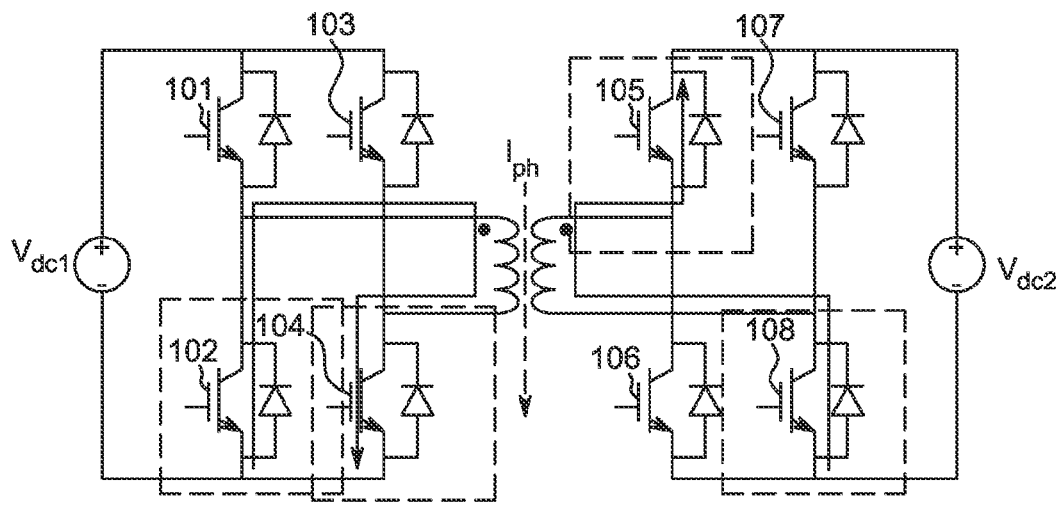
Figure 3C:
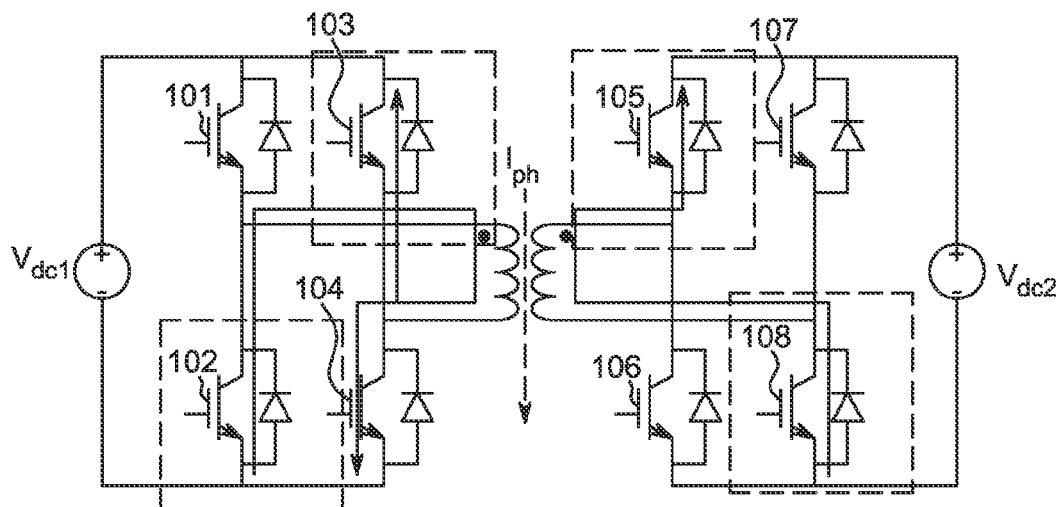
Figure 3D:
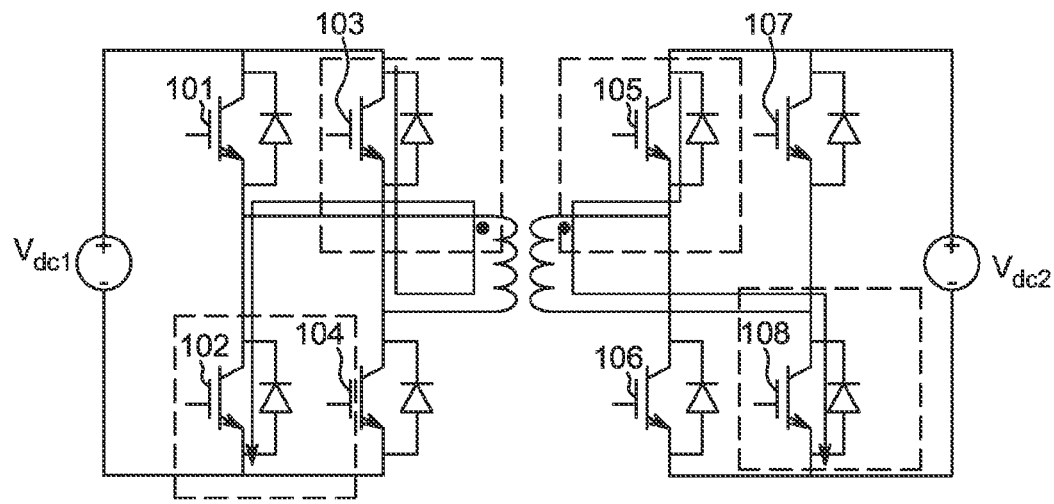
Figure 3E:
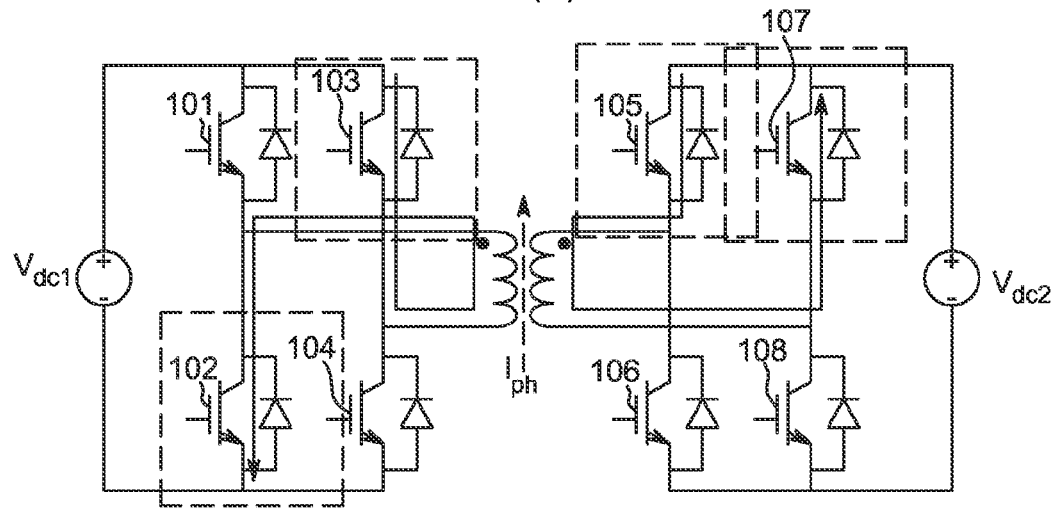
Figure 3F:
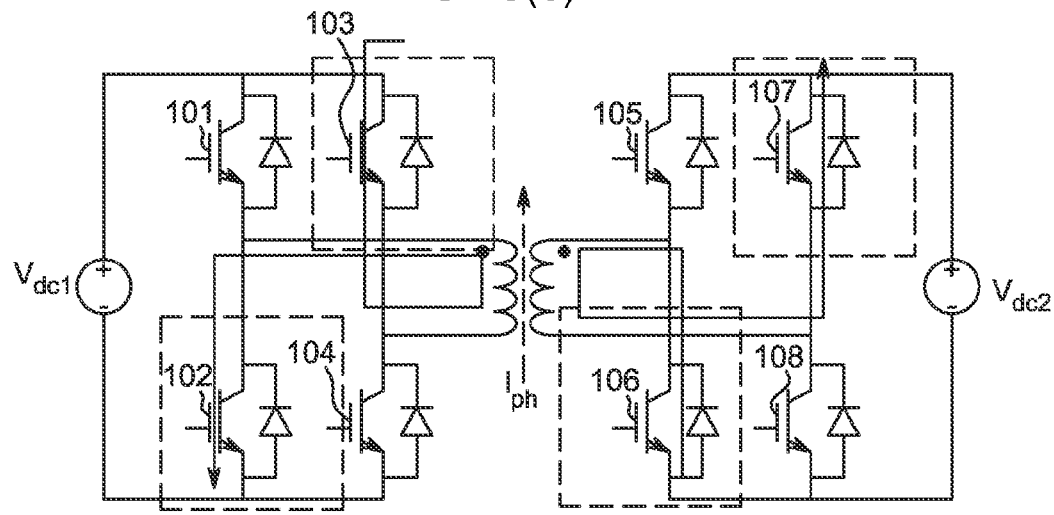
Figure 3G:
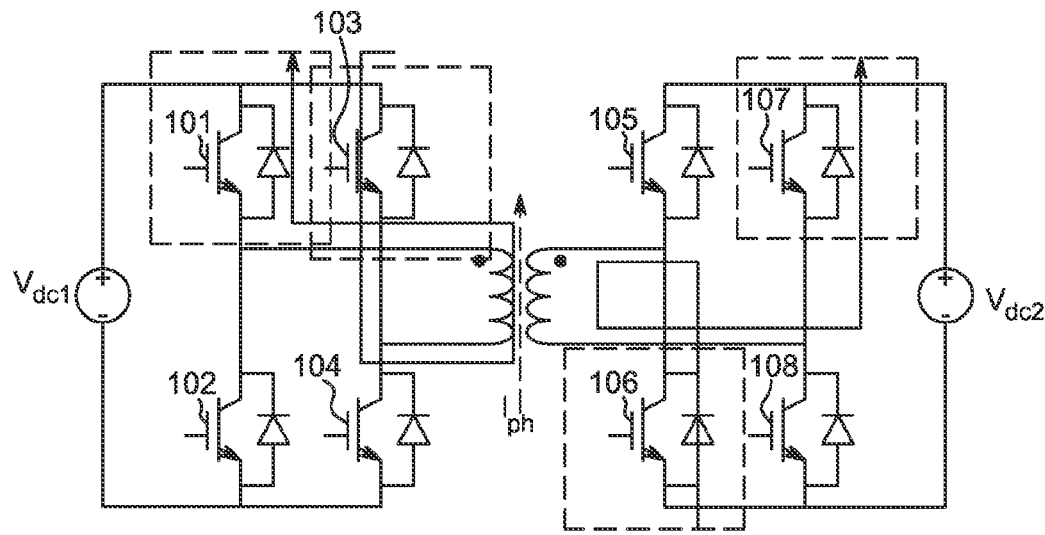
Figure 3H:
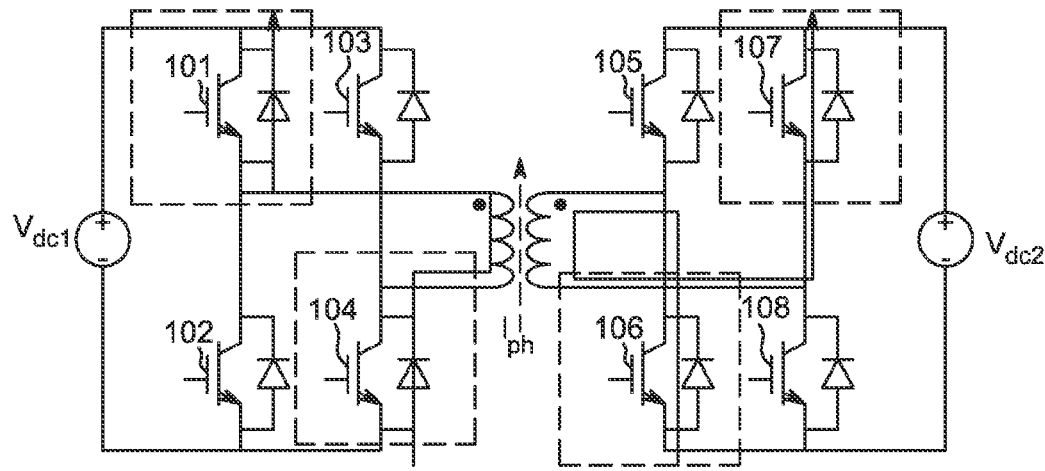
Figure 3I:
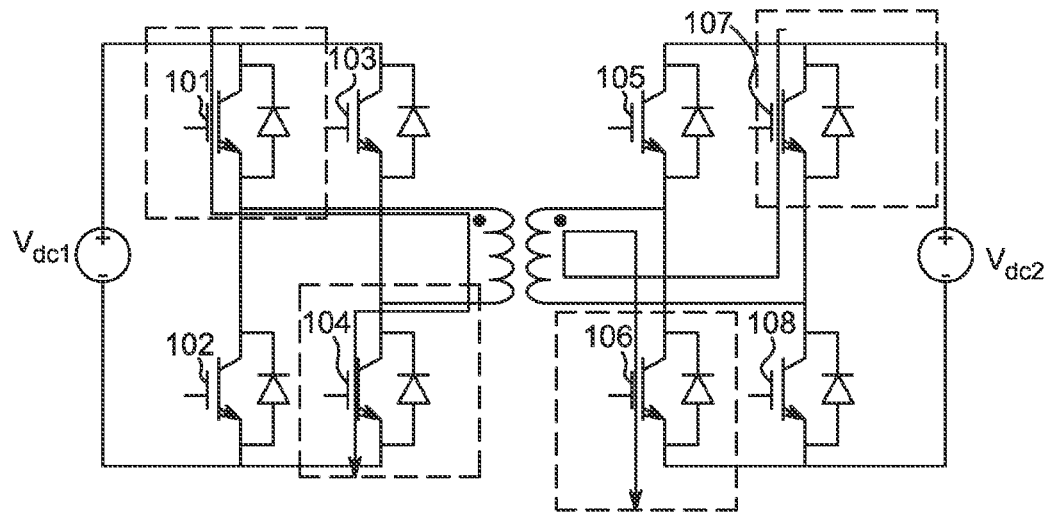
Figure 3J:
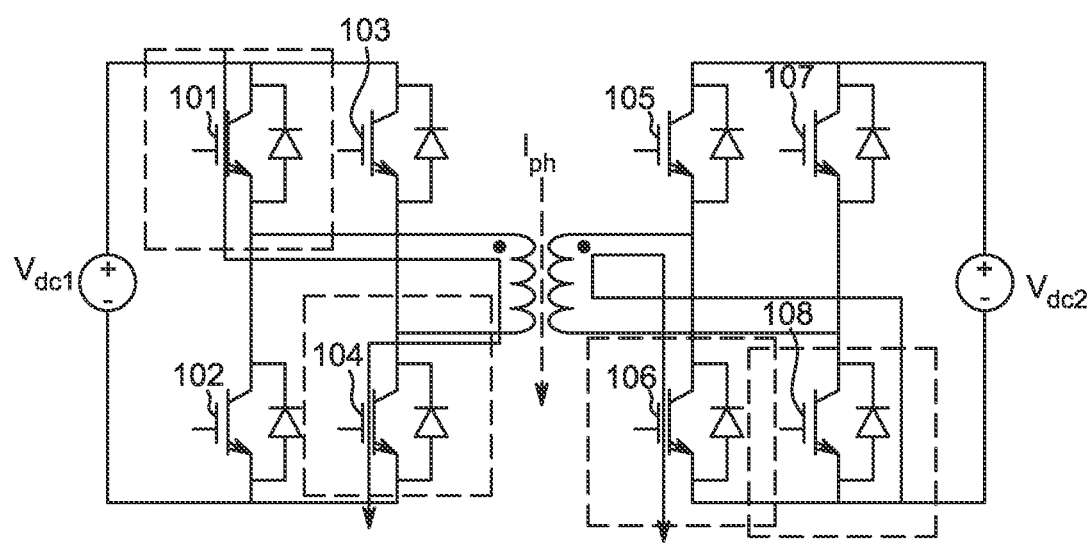
Figure 4A:
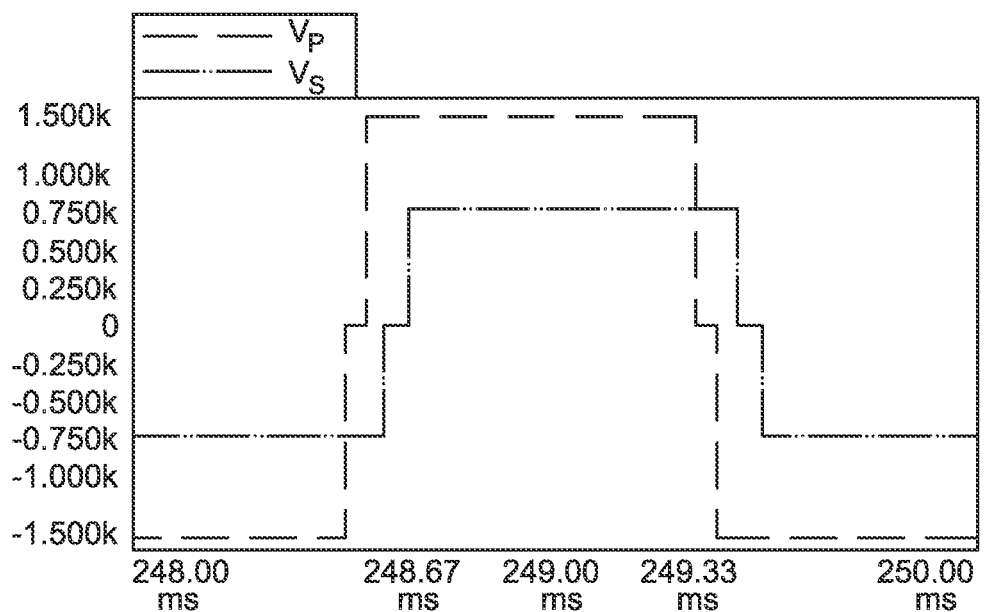
Figure 4B:
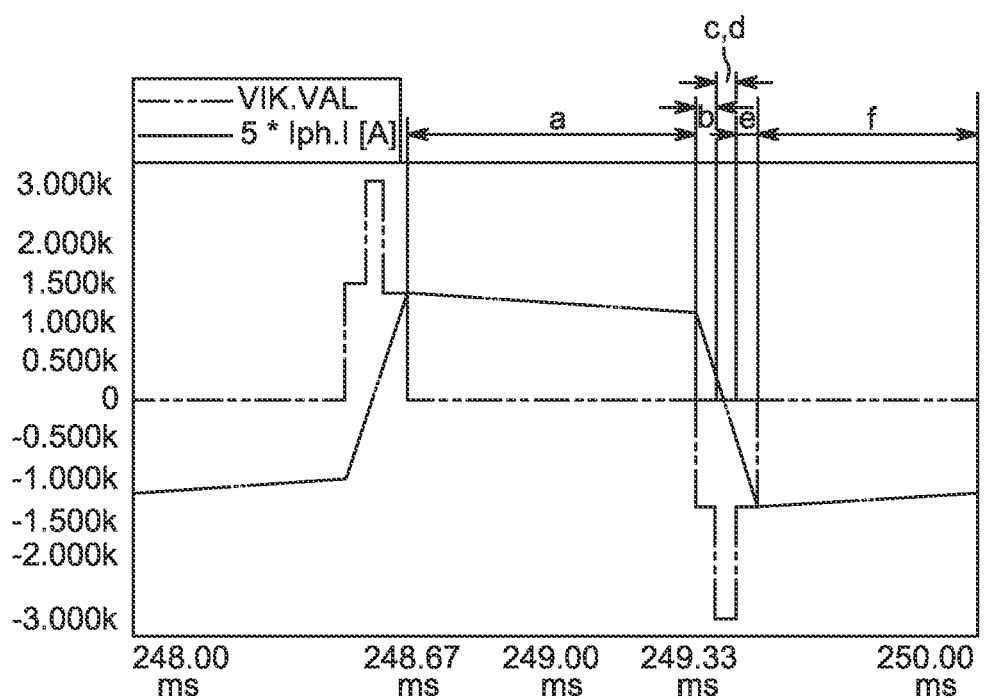

FIGS. 4(a)-4(b) are charts depicting voltage and current in transformer windings of the power converter of FIGS. 3(a)-3(j).

FIGS. 5 and 6 depict equations for determining desirable gate signal phase shifts, according to embodiments of the present invention.

Figure 7:
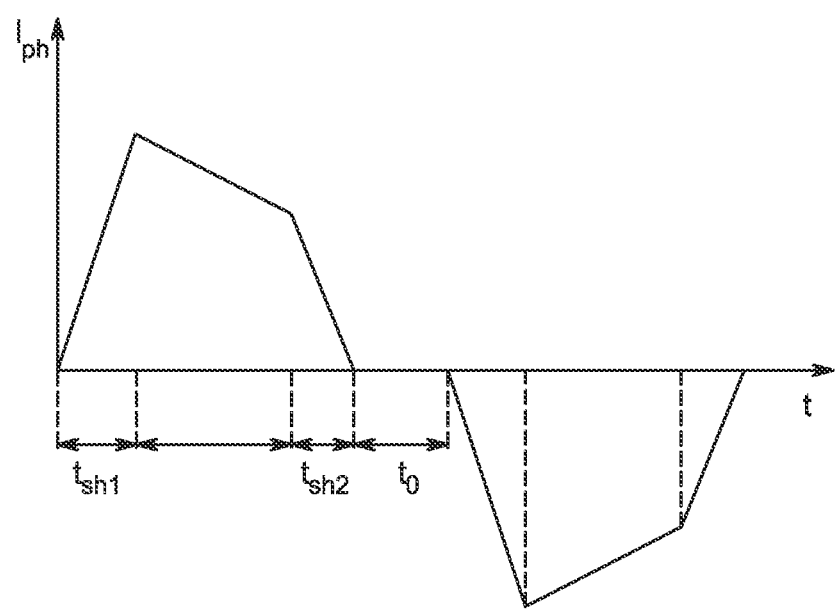

FIG. 7 is a graph depicting a waveform of primary coil current during a full cycle of power converter operation including a zero-current time period t0, according to another embodiment of the present invention.

Figure 8A:
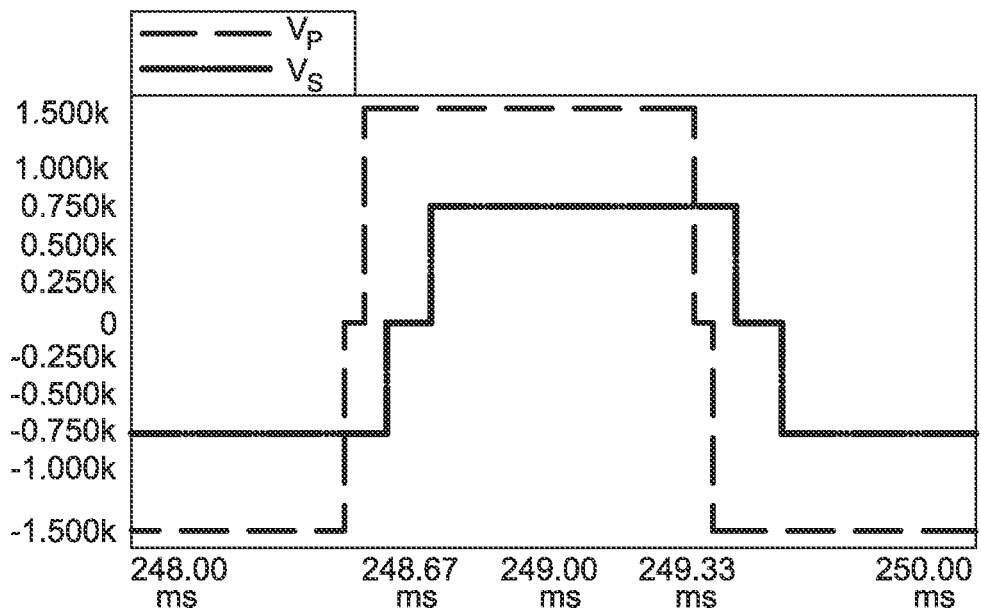
Figure 8B:
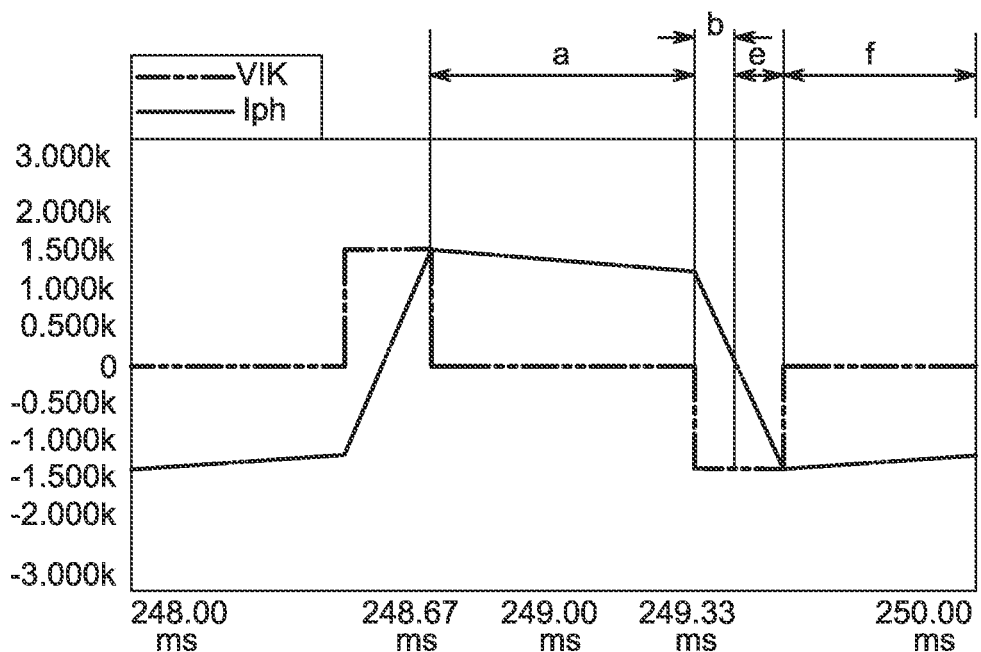

FIGS. 8(a) and 8(b) are charts depicting waveforms of voltage and current during a full cycle of power converter operation including a simultaneously-switched transient, according to embodiments of the present invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. Although exemplary embodiments of the present invention are described with respect to locomotives and other off-highway vehicles, embodiments of the invention are also applicable for use with DC-DC switching power converters generally.

Embodiments of the invention relate to bi-directional power converters that are phase-shift switched for reducing commutation losses and voltage/current stresses within the power converters.

Figure 1:
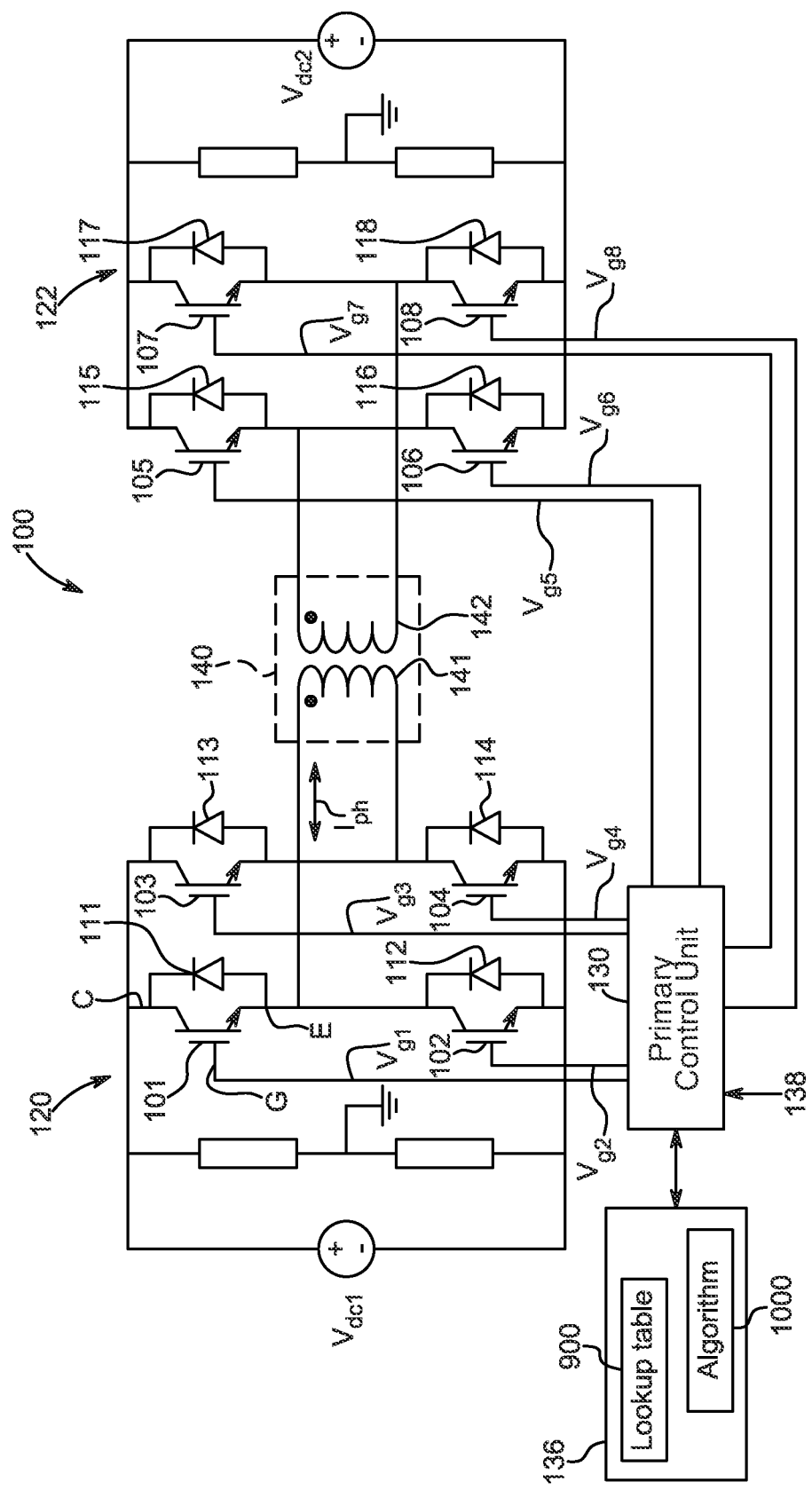
FIG. 1 is a schematic view of an isolated H-bridge power converter, according to an embodiment of the present invention.

FIG. 1 illustrates an embodiment of the invention in which a single-phase isolated bi-directional H-bridge power converter 100 includes a plurality of semiconductor power elements 101, 102, 103, 104, 105, 106, 107, 108. Each power element 101 . . . etc. has a collector C, a gate G, and an emitter E. Each power element also has a corresponding flyback diode 111, 112, 113, 114, 115, 116, 117, and 118 connected anti-parallel across the collector C and the emitter E.

In select embodiments of the present invention, each power element and its corresponding diode together may form a switching module as further discussed in U.S. Pat. No. 8,717,069, issued May 6, 2014, entitled "Converter Switch Apparatus and Method," which is hereby incorporated by reference in its entirety.

Returning to FIG. 1, power elements 101, 102, 103, 104 and their flyback diodes 111, 112, 113, 114 are arranged to form a primary bridge 120, and are "primary power elements" (referring to power elements of the primary bridge), while power elements 105, 106, 107, 108 and their flyback diodes 115, 116, 117, 118 are arranged to form a secondary bridge 122 and are "secondary power elements" (referring to power elements of the secondary bridge). The primary bridge 120 is connected to commutate a DC supply voltage "Vdc1" to provide AC current "Iph" across a primary coil 141 of a transformer 140. The secondary bridge 122 is connected to provide a DC load voltage "Vdc2" by commutating the AC current on the secondary coil 142 of the transformer 140.

Notably, power element 105 is "homologous" to power element 101, in that power element 101 is connected to the high terminal of the primary transformer coil 141 while power element 105 is connected to the high terminal of the secondary transformer coil 142, so that each of the switches in its own bridge functions similarly to the other switch in its other, respective bridge. Similarly, switches 102-106, 103-107, and 104-108 also are "homologous".

As further discussed below with reference to FIGS. 2 and 3, the power elements 101, 102, etc. of the primary bridge 120 are switched ON or OFF by gate voltage signals "Vg1", "Vg2", "Vg3", and "Vg4." The primary bridge gate voltages Vg1 . . . Vg4 are scheduled to commutate the primary DC voltage Vdc1 for providing AC current Iph to the primary coil 141, as further discussed below. The power elements 105, 106, etc. of the secondary bridge 122 are switched ON or OFF by gate voltage signals "Vg5", "Vg6", "Vg7", and "Vg8", which are scheduled to commutate the secondary coil AC current for providing a step down, step-up, or equal DC voltage Vdc2.

As further discussed below with specific reference to FIGS. 2 and 4, operation of the primary and secondary bridges 120, 122 incorporates "phase shifts" between the gate signals for the various semiconductor power elements, such that the power converter may operate with minimal commutation losses, either as a step-down converter to supply secondary DC voltage Vdc2, or as a step-up converter to supply primary DC voltage Vdc1.

Thus, FIG. 1 shows an embodiment of the inventive isolated H-bridge converter 100, which includes primary and secondary bridges 120, 122 connected through a power transformer 140. Each bridge includes a plurality of semiconductor power elements. By appropriately coordinating commutation of the power elements within the primary and secondary bridges 120, 122, the power converter 100 can transfer power in either direction across the transformer 140 while maintaining DC voltages Vdc1, Vdc2 within pre-determined ranges. For example, Vdc2 can be maintained greater than, equal to, or less than Vdc1.

Although FIG. 1 specifically illustrates an exemplary embodiment wherein the semiconductor devices used as power elements are isolated gate bipolar transistors (IGBTs), the present invention is also applicable to other solid state semiconductor devices, including, by way of non-limiting examples: bi-mode isolated gate transistors, MOSFETs, JFETs, IGCTs, or silicon carbide based power semiconductors.

According to aspects of the present invention, the gate voltage signals Vg1 . . . Vg8 are sent to the semiconductor power elements 101 . . . 108 (respectively) in such a way that the total losses in the converter 100 are reduced (relative to other control schemes). In addition, the voltage and current stresses at some of the components in the circuit are lowered, obtaining an overall improvement of the operation (again, relative to other control schemes). For example, the primary and secondary bridges 120, 122 are controlled in the following way: at least one control unit 130 (e.g., a primary control unit) implements a bridge phase shift or delay "dsh" between switching operations of homologous power elements within the primary and secondary bridges 120, 122. Additionally, the control unit 130 introduces primary and secondary diagonal phase shifts "tsh1", "tsh2" between switching of power elements that are "diagonally opposed" to each other within the primary bridge 120 or within the secondary bridge 122. For example, primary power elements 101 and 104 are "diagonally opposed" within the primary bridge 120, as their homologous secondary power elements 105 and 108 are "diagonally opposed" within the secondary bridge 122. In this way the turn-on and turn-off of such devices are not simultaneous but have a time difference. In some embodiments, such as that shown in FIG. 1, at least one additional control unit is provided to separately implement the secondary diagonal phase shift tsh2 and the bridge phase shift dsh. In other words, there are "primary" and "secondary" controllers in certain embodiments.

In embodiments of the invention, the bridge phase shift dsh is adjusted to control the output voltage Vdc2 relative to Vdc1. Increasing dsh will tend to raise Vdc2 and the total power transferred across the transformer 140. Increasing dsh, however, also will tend to increase reactive power losses and circulating current within the primary and secondary bridges 120, 122 and in the transformer 140. By reversing the bridge phase shift dsh, power flow through the power converter 100 can be reversed so that the secondary bridge 122 sends power to the primary bridge 120. This reversal can be useful, for example, in braking a motor connected across Vdc2, or to charge or discharge a battery.

In certain embodiments, the diagonal phase shifts tsh1, tsh2 are adjusted between the series-connected power elements in each of the bridges 120, 122 in order to reach an operation with reduced power element commutation losses (relative to a control scheme where the diagonal phase shifts are not adjusted). The reduced commutation losses can be achieved by reducing and eventually canceling the transformer winding current before and during turning off one or more of the semiconductor power elements ("zero-current switching"), while keeping applied voltage low or zero during the turning on of the same switches ("zero-voltage switching"). "Zero-current" conditions can include switching off a semiconductor power element under a current less than a specific fraction of the power element's rated current, e.g., less than five (5) percent of rated current. Similarly, "zero-voltage" conditions can include switching on a semiconductor power element under a voltage less than a specific fraction of the rated switch voltage, e.g., less than five (5) percent of rated voltage. Meanwhile, "near-zero" conditions can include conditions at less than ten (10) percent of rated current or voltage, including "zero-current" and "zero-voltage" conditions. According to one aspect of the present invention, phase-shifted switching has minimal effect on the semiconductor conduction losses, while the overall converter efficiency is improved.

In some embodiments of the invention, bridge-to-bridge and diagonal phase-shifted gate voltages can be implemented in power converters that operate within a wide voltage range. Phase shifted switching complements the transfer ratio of the power transformer creating a better match between primary and secondary voltages, thus reducing reactive current circulation throughout the entire power range. In another aspect, introducing phase shifted power elements within each individual bridge produces zero vectors within the AC voltage seen by the transformer. These zero vectors allow varying the effective voltage fundamental component, thus, can be manipulated to actively control and reduce the amount of reactive power flowing into the transformer.

Figure 2:
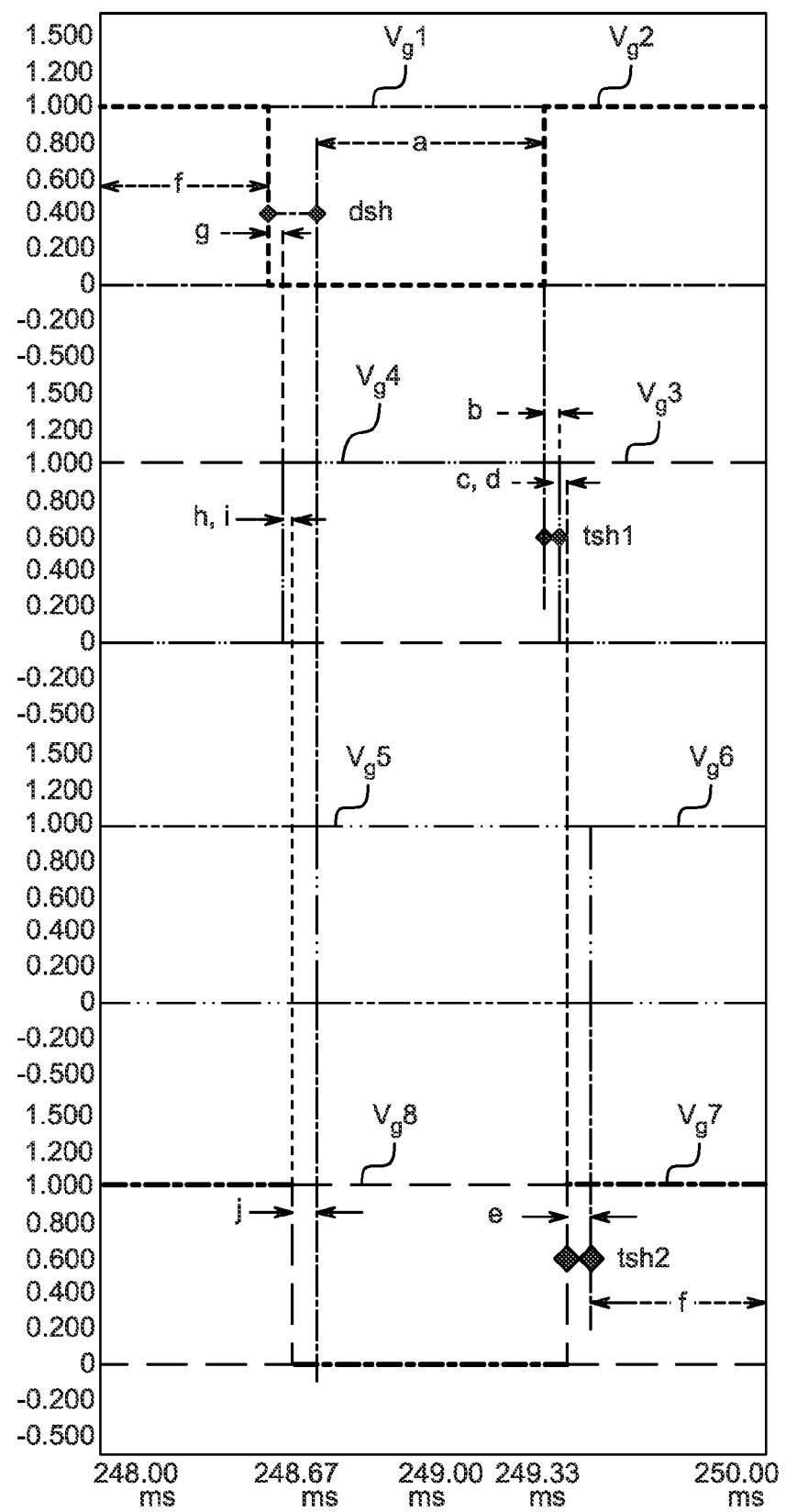
FIG. 2 is a chart depicting a sequence of phase shifted gate signals to be provided to semiconductor power elements of the power converter shown in FIG. 1, according to an embodiment of the present invention.

By way of example, FIG. 2 illustrates gate voltage signals for operation of the power converter 100 according to an embodiment of the present invention. Each change of a gate voltage signal Vg1 ... Vg8 is marked by a lettered arrow that indicates a corresponding switch configuration initiated by that signal, as shown in FIG. 3. As can be seen from FIG. 2, within the primary bridge 120, semiconductor power elements 101 and 102 are "paired" to alternately receive gate voltage. Thus, either power element 101 or 102 is ON whenever the other power element 102 or 101 is OFF. Power elements 103-104, 105-106, and 107-108 are similarly paired. Gate voltage signals to the pair 105-106 lag gate voltage signals to the pair 101-102, by the bridge phase-shift dsh. Gate voltage signals to the pair 103-104 lag gate voltage signals to the pair 101-102, by the primary diagonal phase-shift tsh1. Gate voltage signals to the pair 107-108 lead gate voltage signals to the pair 105-106, by the secondary diagonal phase-shift tsh2. Values of dsh, tsh1, and tsh2 can be determined as functions of Vdc1 and Vdc2 to reduce voltage and current stresses and to reduce commutation losses, as further discussed below. It will be appreciated that power elements need not necessarily be paired, however, such pairing is shown and discussed herein so as to simplify explanation of this exemplary but non-limiting embodiment of the invention.

FIGS. 3(a)-3(j) show an operational sequence of switch configurations within the power converter 100 in response to the gate voltage signals shown in FIG. 2. In FIGS. 3(a)-3(j), power elements gated ON are boxed by dashed lines. Direction of current in the transformer primary winding 141 is shown by arrows labeled Iph. In FIGS. 3(d) and 3(i), momentary zero-current conditions are shown.

FIG. 4(a) shows AC voltage waveforms Vp and Vs across the primary and secondary transformer windings 141, 142, while FIG. 4(b) shows waveforms of leakage inductance equivalent voltage Vlk and for primary winding current Iph within the transformer 140, during operation of the power converter 100 according to FIGS. 2 and 3(a)-(j). The waveform of primary current Iph, as shown in FIG. 4(b), is marked with letters between vertical lines delimiting time periods "a", "b", etc. that correspond to the similarly-lettered gate signals and switch configurations of FIG. 2 and FIGS. 3(a)-3(j).

Referring back to FIG. 2, the gate signal "a" turns OFF the power element 106 and turns ON the paired power element 105, within the secondary bridge 122. FIG. 3(a) shows the resulting configuration of power elements 101 ... 108 during the time period "a" as marked on FIG. 4. In FIG. 3(a), power elements 101, 104, 105, and 108 are marked by dashed-line boxes as being forward-biased or "gated ON" by their respective gate voltage signals. Thus, turning OFF the power element 106 directs secondary coil current to the high side of Vdc2 via the flyback diode 115, thereby powering the load. Therefore, throughout time period "a", impedance of the load Vdc2 causes primary coil current Iph to flow, at a rate diminishing toward steady state, from the high side of Vdc1 through power element 101, primary winding 141, and power element 104, as shown in FIG. 4(b).

At the end of time period "a", FIG. 2 shows the power element 101 is gated OFF while the power element 102 is gated ON to achieve the lineup or configuration shown in FIG. 3(b), which depicts an embodiment of the invention. This new switch configuration "b" removes Vdc1 from the primary coil 141 so that, as shown in FIG. 4(b), the primary coil current Iph rapidly decays toward zero as the inductive field of the primary coil 141 collapses.

Referring to FIG. 4(b) and to FIG. 2, after a delay tsh1 during which the primary coil current Iph approaches zero value, power element 104 is gated OFF while power element 103 is gated ON, establishing the configuration shown in FIG. 3(c). Vdc1 now is applied opposite the inductive voltage on the primary coil, driving Iph to reverse, and thereby completing a positive polarity half cycle of operation for the power converter 100. FIG. 3(d) shows the same switch configuration as in FIG. 3(c), however, with current Iph reversing at near-zero value.

As mentioned above, zero-current switching of at least one power element (in time periods "a"-"c", the power elements 103 and 104) can reduce commutation losses of the power converter 100 as a whole. Accordingly, FIGS. 2 and 4(b) show that before the primary coil current Iph increases toward its negative peak value, power element 107 is gated ON while power element 108 is gated OFF. Thus, the power converter 100 transitions through the switch configurations shown in FIGS. 3(d)-3(e) at low (near-zero) values of Iph. Thus, the power elements 107 and 108 also can be considered as "zero-current switched."

After time period "e" of duration tsh2, the primary coil current Iph reaches its negative peak as shown in FIG. 4(b). Power elements 105 and 106 then are respectively gated OFF and ON to initiate switch configuration and time period "f", as shown in FIG. 2 and in FIGS. 3(e)-3(f). By properly adjusting the delay or diagonal phase shift tsh2, power elements 105 and 106 also can be considered as zero-current switched. Therefore, it is possible to reverse polarity of the power converter 100 while switching only two power elements under significant current (in this example, the power element 101 in the primary bridge 120 and power element 105 in the secondary bridge 122). In this regard, the flyback diode 112 bypasses the power element 102 when it is gated ON at the beginning of time period "b".

Referring back to FIGS. 2 and 4, the switch configuration established in FIG. 3(f) then is maintained while the amplitude of negative primary coil current Iph gradually diminishes towards its steady-state value. At the end of time period "f", FIG. 2 shows power element 101 gated ON and power element 102 gated OFF, resulting in the configuration shown at FIG. 3(g). The transition to this switch configuration "g" coincides with a sharp reduction in primary coil current magnitude, just as did the transition from switch configuration "a" to switch configuration "b". Referring to FIGS. 2, 3(h)-(j), and 4(b), it is apparent that the remaining gate signals and switch configurations complete a negative half-cycle of operation for the power converter 100, ending with a return to the switch configuration shown at FIG. 3(a). Again, by properly adjusting the diagonal phase shifts tsh1 and tsh2, it is possible to complete the entire cycle of operation while switching-off only four power elements under significant current: power element 101 and power element 102 in the primary bridge 120 and power elements 105 and 106 on the secondary side. Moreover, it is possible to provide near-constant Vdc2 essentially via the secondary flyback diodes 115, 116, 117, 118, with the secondary power elements 105, 106, 107, 108 conducting all under zero-voltage conditions.

While the bridge phase shift dsh can be selected according to desired power transfer, in embodiments, the diagonal phase shift tsh1 is chosen in dependence on the bridge phase shift dsh so as to achieve a desired sequence of power element configurations within the primary and secondary bridges. In particular, tsh1 and tsh2 could have either positive or negative values. Considering the primary side as reference, the described sequence corresponds to a positive tsh1 and a negative tsh2. To achieve the operation sequence and current waveform shown in FIGS. 3 and 4, pre-determined values of tsh1 and of tsh2 can be set based on dsh, according to the equation of FIG. 5. In practice, pluralities of pre-determined values for tsh1 and tsh2, corresponding to particular values of dsh, can be stored as a lookup table 900 within a non-volatile memory 136 connected with the at least one control unit 130, as shown in FIG. 1. According to one aspect of the present invention, the power converter 100 then can be adjusted during operation in response to one or more operator inputs 138, by accessing the lookup table according to an algorithm 1000 also stored in the non-volatile memory 136 and implemented in the one or more control units 130. According to another aspect, tsh1 and tsh2 can be calculated in real time by the at least one control unit 130.

With reference to FIGS. 6 and 7, according to another aspect of the present invention, values of the phase shifts dsh, tsh1, tsh2 may be chosen to provide zero or near-zero current conditions in the transformer 140 during a designated duration t0 (FIG. 7). According to yet another aspect of the present invention, values of tsh1 and tsh2 may be chosen to achieve simultaneous or nearly simultaneous switching from the configuration of FIG. 3(b) to that of FIG. 3(e) (thereby providing voltage and current waveforms generally as shown by FIGS. 8(a) and 8(b)).

In embodiments, a power converter includes a primary bridge having a plurality of diagonally opposed primary power elements, and a secondary bridge having a plurality of diagonally opposed secondary power elements. The primary and secondary bridges are electrically coupled by a transformer. At least one control unit is configured to phase-shift switch the primary and secondary power elements, such that one or more of the primary and secondary power elements are switched off under zero current conditions.

In certain embodiments, the at least one control unit may be further configured to phase-shift switch at least one secondary power element in the secondary bridge relative to a homologous primary power element in the primary bridge, such that during each power cycle of the power converter, a zero current condition of a designated duration is established in the transformer. Additionally, the control unit may be further configured to switch on one or more of the primary and secondary power elements under zero voltage conditions. In select embodiments, the control unit is further configured to alternately switch one or another of the primary power elements, or one or another of the secondary power elements, under zero voltage conditions.

In embodiments, a power converter includes a primary bridge having a plurality of diagonally opposed primary power elements; a secondary bridge having a plurality of diagonally opposed secondary power elements; and a transformer electrically coupled to the primary and secondary bridges. At least one control unit is configured to phase-shift switch the primary and secondary power elements, such that there is a bridge phase-shift between the primary and secondary bridges, and there are diagonal phase-shifts within the primary bridge and within the secondary bridge. In select embodiments, the diagonal phase-shifts within the primary and secondary bridges are determined based on at least the bridge phase-shift.

In select embodiments, the at least one control unit is configured to adjust an output voltage of the power converter by phase-shifted switching of the secondary bridge with respect to the primary bridge, such that a leading element of the secondary power elements of the secondary bridge is switched on or switched off after a delay following turning on or turning off a homologous leading element of the primary power elements of the primary bridge. Also, the at least one control unit may be further configured to establish in the transformer, during each power cycle of the power converter, a zero current condition of a designated duration. The transformer zero current condition may be established by implementing a diagonal phase-shifted switching of the primary bridge such that a lagging element of the primary power elements of the primary bridge, which diagonally opposes the leading element of the primary bridge, is switched off at a first time interval after turn-off of the leading primary bridge element. In certain embodiments, the transformer zero current condition is established by also implementing a diagonal phase-shifted switching of the secondary bridge, such that a lagging element of the secondary power elements of the secondary, which diagonally opposes the leading element of the secondary bridge, is switched off at a second time interval after turn-off of the leading secondary bridge element.

In embodiments, the at least one control unit may be configured to determine the first time interval as a function of at least the bridge phase shift delay, a DC voltage of the primary bridge, a DC voltage of the secondary bridge, and a designated duration of zero current condition. The at least one control unit may be configured to determine the second time interval as a function of at least the bridge phase shift delay, the first time interval, a DC voltage of the primary bridge, a DC voltage of the secondary bridge, and a designated duration of zero current condition.

According to aspects of the present invention, a method for controlling a power converter includes at least one of diagonal phase-shifted switching of at least two diagonally opposed primary power elements within a primary bridge or diagonal phase-shifted switching of at least two diagonally opposed secondary power elements within a secondary bridge of the power converter, and also includes bridge phase-shifted switching of at least one secondary power element, relative to a homologous primary power element.

Diagonal phase-shifted switching may include switching a lagging element of the primary bridge at a first time interval after switching a diagonally opposite leading element of the primary bridge, the first time interval chosen such that at least the lagging element is switched off at a zero current condition. For example, the first time interval may be determined as a function of at least the bridge phase shift delay, a DC voltage of the primary bridge, a DC voltage of the secondary bridge, and a designated duration of zero current condition.

Bridge phase-shifted switching may include switching on a leading element of the secondary bridge after a delay following turning on or turning off a homologous leading element of the primary bridge, the delay being determined based on a desired output voltage of the power converter.

In certain aspects, a transformer zero current condition is established by also implementing diagonal phase-shifted switching of the secondary bridge, such that a lagging secondary bridge element diagonal from the leading secondary bridge element is switched off at a second time interval after a turn-off of the leading secondary bridge element. For example, the second time interval is determined as a function of at least the bridge phase shift delay, the first time interval, a DC voltage of the primary bridge, a DC voltage of the secondary bridge, and a designated duration of zero current condition.

According aspects of the present invention, a power converter is controlled by phase-shifted switching of primary power elements within a primary bridge of the power converter, and by phase-shifted switching of secondary power elements within a secondary bridge of the power converter, such that one or more of the primary and secondary power elements are switched off under zero current conditions and are switched on under zero voltage conditions. In certain aspects, phase-shifted switching includes bridge phase-shifted switching such that a leading secondary power element is switched after a delay following switching of a homologous leading primary power element.

In some aspects, phase-shifted switching includes diagonal phase-shifted switching such that at least one of the leading secondary power element, the homologous leading primary power element, or another leading power element in at least one of the primary or secondary bridges is switched at a time interval before a diagonally opposite lagging power element within the same one of the primary or secondary bridges. For example, the diagonal phase-shifted switching may be in the primary bridge, and the time interval may be a first time interval determined as a function of at least the bridge phase shift delay, a DC voltage of the primary bridge, a DC voltage of the secondary bridge, and a designated duration of zero current condition. As another example, the diagonal phase-shifted switching may be in the secondary bridge, and the time interval may be a second time interval determined as a function of at least the bridge phase shift delay, the first time interval, a DC voltage of the primary bridge, a DC voltage of the secondary bridge, and a designated duration of zero current condition.

In some aspects of bridge phase-shifted switching, the delay may be chosen based on an output voltage from the power converter. In some aspects of phase-shifted switching, the switching is adjusted based at least in part on an operator input to a control unit.

Thus, by adjusting the diagonal phase shift time intervals, it is possible to operate a power converter such as the exemplary power converter shown in FIG. 1, while switching only two power elements in the primary bridge and two power elements in the secondary bridge under non-zero current. Additionally, it is possible to provide near constant output voltage while secondary power elements conduct only under zero-current or near-zero-current conditions. Thus, durability of a power converter can be enhanced by reducing thermal stresses on the individual power elements.

Another embodiment relates to a control unit for a bi-directional H-bridge converter. The control unit is configured to be operably coupled to the converter and to generate plural output control signals to: (i) phase-shift switch diagonally opposed primary power elements of a primary bridge of the converter and diagonally opposed secondary power elements of a secondary bridge of the converter, such that there is a bridge phase-shift between the primary and secondary bridges, and there are diagonal phase-shifts within the primary bridge and the secondary bridge. The control unit is further configured to control the diagonal phase-shifts within the primary and secondary bridges based on at least the bridge phase-shift.

In embodiments, first and second power elements 101, 104 are diagonally opposed when they are in different legs (e.g., a first leg comprising power elements 101, 102, and a second leg comprising power elements 103, 104) of a common power converter (e.g., each leg connected to the same power source and driving, at least in some modes, a shared load) and connected to different rails (Vdc+ or Vdc−) of the common power source.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above power converter and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A power converter comprising:
   a primary bridge having a plurality of diagonally opposed primary power elements;
   a secondary bridge having a plurality of diagonally opposed secondary power elements;
   a transformer electrically coupled to the primary and secondary bridges; and
   at least one control unit configured to phase-shift switch the primary and secondary power elements, such that one or more of the primary and secondary power elements are switched off under zero current conditions,
   wherein the at least one control unit is further configured to phase-shift switch at least one secondary power element in the secondary bridge relative to a homologous primary power element in the primary bridge, such that during each power cycle of the power converter, a zero current condition of a designated duration is established in the transformer.

2. A power converter as claimed in claim 1, wherein the at least one control unit is further configured to switch on one or more of the primary and secondary power elements under zero voltage conditions.

3. A power converter as claimed in claim 2, wherein the at least one control unit is further configured to alternately switch one or another of the primary power elements, or one or another of the secondary power elements, under zero voltage conditions.

4. A power converter comprising:
   a primary bridge having a plurality of diagonally opposed primary power elements;
   a secondary bridge having a plurality of diagonally opposed secondary power elements;
   a transformer electrically coupled to the primary and secondary bridges; and
   at least one control unit configured to phase-shift switch the primary and secondary power elements, such that there is a bridge phase-shift between the primary and secondary bridges, and there are diagonal phase-shifts within the primary bridge and within the secondary bridge,
   wherein the at least one control unit is configured to adjust an output voltage of the power converter by phase-shifted switching of the secondary bridge with respect to the primary bridge, such that a leading element of the secondary power elements of the secondary bridge is switched on or switched off after a delay following turning on or turning off a homologous leading element of the primary power elements of the primary bridge.

5. A power converter as claimed in claim 4, wherein the at least one control unit is configured to establish in the transformer, during each power cycle of the power converter, a zero current condition of a designated duration,
   wherein the transformer zero current condition is established by implementing a diagonal phase-shifted switching of the primary bridge such that a lagging element of the primary power elements of the primary bridge, which diagonally opposes the leading element of the primary bridge, is switched off at a first time interval after turn-off of the leading element of the primary bridge, and
   implementing a diagonal phase-shifted switching of the secondary bridge, such that a lagging element of the secondary power elements of the secondary bridge, which diagonally opposes the leading element of the secondary bridge, is switched off at a second time interval after turn-off of the leading element of the secondary bridge.

6. A power converter as claimed in claim 5, wherein the at least one control unit is configured to determine the first time interval as a function of at least:
   the bridge phase shift delay;
   a DC voltage of the primary bridge;
   a DC voltage of the secondary bridge; and
   a designated duration of zero current condition.

7. A power converter as claimed in claim 5, wherein the at least one control unit is configured to determine the second time interval as a function of at least:
   the bridge phase shift delay;
   the first time interval;
   a DC voltage of the primary bridge;
   a DC voltage of the secondary bridge; and
   a designated duration of zero current condition.

8. A method for controlling a power converter, the method comprising:
   at least one of diagonal phase-shifted switching of at least two diagonally opposed primary power elements within a primary bridge or diagonal phase-shifted switching of at least two diagonally opposed secondary power elements within a secondary bridge of the power converter; and
   bridge phase-shifted switching of at least one secondary power element in the secondary bridge, relative to a homologous primary power element in the primary bridge,
   wherein diagonal phase-shifted switching includes switching a lagging element of the primary bridge at a first time interval after switching a diagonally opposite leading element of the primary bridge, the first time interval chosen such that at least the lagging element is switched off at a zero current condition.

9. A method as claimed in claim 8, wherein bridge phase-shifted switching includes switching on a leading element of the secondary bridge after a delay following turning on or turning off a homologous leading element of the primary bridge, the delay being determined based on a desired output voltage of the power converter.

10. A method as claimed in claim 9, wherein the first time interval is determined as a function of at least:
    the bridge phase shift;
    a DC voltage of the primary bridge;
    a DC voltage of the secondary bridge; and
    a designated duration of zero current condition.

11. A method as claimed in claim 10, wherein a transformer zero current condition of a transformer of the power converter is established by also implementing diagonal phase-shifted switching of the secondary bridge, such that a lagging element of the secondary bridge that is diagonal from the leading element of the secondary bridge is switched off at a second time interval after turn-off of the leading element of the secondary bridge.

12. A method as claimed in claim 11, wherein the second time interval is determined as a function of at least:

the bridge phase shift;
the first time interval;
a DC voltage of the primary bridge;
a DC voltage of the secondary bridge; and
a designated duration of zero current condition.

13. A method for controlling a power converter, the method comprising:
phase-shifted switching of primary power elements within a primary bridge of the power converter; and
phase-shifted switching of secondary power elements within a secondary bridge of the power converter,
such that one or more of the primary and secondary power elements are switched off under zero current conditions and are switched on under zero voltage conditions
wherein phase-shifted switching includes bridge phase-shifted switching such that a leading secondary power element is switched after a delay following switching of a homologous leading primary power element,
wherein phase-shifted switching includes diagonal phase-shifted switching such that at least one of the leading secondary power element, the homologous leading primary power element, or another leading power element in at least one of the primary or secondary bridges is switched at a time interval before a diagonally opposite lagging power element within the same one of the primary or secondary bridges.

14. A method as claimed in claim 13, wherein the diagonal phase-shifted switching is in the primary bridge and the time interval is a first time interval determined as a function of at least:
the bridge phase shift;
a DC voltage of the primary bridge;
a DC voltage of the secondary bridge; and
a designated duration of zero current condition.

15. A method as claimed in claim 13, wherein the diagonal phase-shifted switching is in the secondary bridge and the time interval is a second time interval determined as a function of at least:
the bridge phase shift;
a DC voltage of the primary bridge;
a DC voltage of the secondary bridge; and
a designated duration of zero current condition.

16. A method as claimed in claim 13, wherein the delay is chosen based on an output voltage from the power converter.

17. A method as claimed in claim 13, wherein the phase-shifted switching is adjusted based at least in part on an operator input to a control unit.

* * * * *